US006132879A

United States Patent [19]

Tamura et al.

[11] Patent Number: 6,132,879

[45] Date of Patent: Oct. 17, 2000

[54] RECORDING MEDIA COMPRISING MONOVALENT ANIONS

[75] Inventors: Kenji Tamura, Kawasaki; Hideki Hayashida; Hiroyuki Takahashi, both of Tokyo; Teruo Hosokawa, Kawasaki, all of Japan

[73] Assignee: Showa Denko K.K., Tokyo, Japan

[21] Appl. No.: 08/988,822

[22] Filed: Dec. 11, 1997

[30] Foreign Application Priority Data

Dec. 13, 1996 [JP] Japan .................................... 8-334005

[51] Int. Cl.$^7$ ........................................................ B32B 9/04

[52] U.S. Cl. ....................... 428/411.1; 428/195; 428/211; 428/332; 428/335; 428/336

[58] Field of Search .................................... 428/195, 206, 428/209, 211, 331, 520, 522, 532, 534, 535, 536, 704, 323, 328, 330, 332, 335, 336

[56] References Cited

U.S. PATENT DOCUMENTS 4,613,525 9/1986 Miyamoto et al. ..................... 427/256

5,560,996 10/1996 Ito et al. ................................. 428/500

FOREIGN PATENT DOCUMENTS

0633143 A1 1/1995 European Pat. Off. .

OTHER PUBLICATIONS

"Solid State Ionics" 26 (1998) 77–86.

"Clay and Clay Minerals" vol. 28, No. 2, pp. 87–91, 1980.

"Clay and Clay Minerals" vol. 23, pp. 369–375.

"Clay and Clay Minerals" vol. 31, No. 4, pp. 305–311, 1983.

*Primary Examiner*—Bruce H. Hess

*Assistant Examiner*—Michael E. Grendzynski

*Attorney, Agent, or Firm*—Sughrue, Mion, Zinn, Macpeak & Seas, PLLC

[57] ABSTRACT

Disclosed is a recording medium having a surface layer containing a compound having a layer structure on the recording medium, wherein exchangeable anions are present between layers of the compound and at least a part of said exchangeable anions are monovalent anions. The recording medium has excellent ink absorption property, fixing property of coloring matters and clearness, and is capable of forming an image of excellent sharpness and water resistance.

6 Claims, No Drawings

RECORDING MEDIA COMPRISING MONOVALENT ANIONS

FIELD OF THE INVENTION

The present invention relates to recording media, and more particularly to recording media each of which has a surface layer containing a specific compound having a layer structure (hereinafter referred to a layered compound) and is capable of providing printed matters almost free from bleeding.

The term "recording media" used herein means all materials on which printing or writing is made, and the recording media include not only materials used for ordinary printing using coloring matters such as dyes or pigments and materials used for ink-jet recording (printing) but also materials used for writing with pencils or ball-point pens.

BACKGROUND OF THE INVENTION

The ink-jet printing (recording) system is a system wherein ink droplets are jetted onto a recording sheet such as paper utilizing various working principles to perform recording of images or characters on the sheet. The ink-jet recording system is characterized in that high-speed, low-noise and multicolor recording is feasible, flexibility of recording pattern is great, and developing and fixing processes are unnecessary. Therefore, the ink-jet recording system has rapidly spread as a system for recording various figures (e.g., Chinese characters) and color images, and is applied to various uses.

Further, rapid progress of ink-jet printers used for the ink-jet recording system has been made in these several years, and printers of high resolution, e.g., 720 to 1,440 dpi, have been developed.

With variation of use applications of the ink-jet printing system, recording media used for the system have been desired to have higher printing qualities. For example, the following qualities are desired.

(1) The ink is absorbed quickly, the printed dots are fine, and the color tone is bright and vivid.

(2) The ink is absorbed quickly, and there is no running or bleeding of ink even when the printed dots are overlapped.

(3) After printing, the printed surface of the recording medium has excellent water resistance.

The term "water resistance" used herein means such a stable image-receiving property that no bleeding or running of ink takes place when the recording medium is exposed to moisture after completion of printing.

The recording materials used for the ink-jet printing system are broadly divided into two types, namely, plane paper type, such as wood free paper and bond paper, and coated type wherein an ink-receiving layer is provided on a surface of a support (substrate) made of paper (e.g., wood free paper), synthetic paper, synthetic resin film or the like.

The ink used for the ink-jet printing system generally has, as a counter ion, a cation which is substituted due to change of pH to vary the ink to water-soluble one. On a common resin substrate, however, the ink has poor affinity for the resin support and poor retention of a coloring matter transferred, resulting in various problems. For example, the substrate sheds ink, a defaced image is formed because of excessive ink, or a non-printed area is produced because of insufficient printing.

To cope with these problems, a trial of providing an ink-receiving layer comprising a water-soluble polymer, such as, polyvinyl alcohol, starch, gelatin, cellulose derivative (e.g., hydroxyethyl cellulose, methyl cellulose), poly(meth)acrylic acid or a salt thereof, on a surface of the substrate has been proposed to improve the ink absorption of the substrate.

In Japanese Patent Laid-Open Publication No. 135785/1986 (Japanese Patent Publication No. 15747/1992), a recording medium containing a hydrotalcite compound represented by $Mg_6Al_2(OH)_{16}CO_3.4H_2O$ or $Mg_{4-5}Al_2(OH)_{16}CO_3.mH_2O$ (m is 3 to 3.5) is proposed. The hydrotalcite compound is known as a layered compound, and the ink absorption of the substrate is improved by allowing the layered compound to occlude an anionic coloring matter between layers of the compound.

The hydrotalcite has a polyvalent anion such as a divalent anion ($CO_3^{2-}$) or a higher-valent anion, and the polyvalent anion is firmly fixed between layers. Therefore, such hydrotalcite has poor capability of occluding the anionic coloring matter and cause bleeding in the ink-jet printing process.

Further, as ink for the color ink-jet printing system, a fine particle pigment came to be used. In some cases, however, the pigment ink is not uniformly absorbed because of rough surface of the ink-receiving layer or variability of chemical properties of the ink-receiving layer surface. In order to perform uniform printing with high chromaticness, therefore, it is desired that the hydrotalcite particles are of extremely small sizes and are uniformly dispersed in the binder.

Under such circumstances as described above, the present inventors have earnestly studied and have found that a layered compound, such as a hydrotalcite or a hydrotalcite-like compound having a similar structure to that of hydrotalcite (both being generically referred to as "hydrotalcite type compound" hereinafter), in which exchangeable anions are present between layers and at least a part of said exchangeable anions (interlayer anions) are monovalent anions, shows excellent ink absorption and a function of firmly fixing coloring matters. The present inventors have also found that, utilizing the above properties of the hydrotalcite type compound, the clearness and sharpness of an image can be improved by uniformly coating a substrate with the hydrotalcite type compound in the form of a fine powder. Based on the finding, the present invention has been accomplished.

OBJECT OF THE INVENTION

The present invention is intended to solve such problems associated with the prior art as mentioned above, and it is an object of the invention to provide a recording medium which has excellent ink absorption property, fixing property of coloring matter and is capable of forming an image of excellent clearness and sharpness and water resistance.

SUMMARY OF THE INVENTION

The recording medium according to the present invention has a surface layer containing a compound having a layer structure on the recording medium, wherein exchangeable anions are present between layers of the compound and at least a part of said exchangeable anions are monovalent anions.

The ionic charge of the monovalent anions is preferably not less than 50% of the total ionic charge of the exchangeable anions. The monovalent anion is preferably at least one anion selected from $OH^-$, $F^-$, $Cl^-$, $Br^-$, $NO_3^-$, $I^-$ and $CH_3COO^-$.

The layered compound is preferably hydrotalcite or a hydrotalcite compound. The layered compound preferably has an average particle diameter of not more than 1.0 μm.

It is preferable that the layered compound is contained in the surface layer in an amount of 1 to 70% by weight and the surface layer has a thickness of 3.0 to 100 μm.

The ink-jet recording sheet according to the present invention comprises the above-mentioned recording medium.

DETAILED DESCRIPTION OF THE INVENTION

The recording medium according to the invention is described in detail hereinafter.

The recording medium of the invention comprises a substrate and a layer provided on a surface of the substrate, said layer containing a compound having a layer structure (a layered compound) in which exchangeable anions are present between layers of the compound and at least a part of said exchangeable anions are monovalent anions.

First, the substrate and the layered compound used in the invention are described.

Substrate

As the substrate, various materials such as paper (wood free paper), coated paper, synthetic paper, Japanese paper, non-woven fabric and synthetic resin film are employable.

The synthetic resin film generally has a thickness of 10 to 300 μm, and examples of the synthetic resins include polyester resins, such as polyethylene terephthalate, polybutylene terephthalate, polyethylene naphthalate, aliphatic polyesters and aromatic polyesters; polycarbonate resin; polystyrene; acrylonitrile resins, such as a styrene-acrylonitrile-butadiene copolymer and polyacrylonitrile; an ethylene-propylene copolymer; an ethylene-butene copolymer; an ethylene-hexene copolymer; a styrene-ethylene-butene copolymer; an ethylene-vinyl acetate copolymer; an ethylene-methacrylate copolymer polyphenylene ether; polyacetal; polysulfone resin; halogen-containing resins, such as polyvinylidene chloride and polyvinylidene fluoride; and amorphous polymers. Of the synthetic resins, the polyester resins are particularly preferable from the viewpoints of mechanical strength and workability. The synthetic resin film may be subjected to electron-ray treatment, γ-ray treatment, corona treatment or anchor treatment to improve adhesion to an ink-receiving layer (surface layer) provided thereon.

Layered Compound

The layered compound used in the invention is a specific compound having a layered structure where exchangeable anions are present between layers thereof, and at least a part of said exchangeable anions are monovalent anions.

The ionic charge of the monovalent anions is not less than 50%, preferably not less than 70%, more preferably not less than 85%, of the total ionic charge of the exchangeable anions.

The monovalent anion is preferably at least one anion selected from $OH^-$, $F^-$, $Cl^-$, $Br^-$, $NO_3^-$, $I^-$ and $CH_3COO^-$.

Particularly preferable as the layered compound are hydrotalcite type compounds represented by the following formulas:

$$[M^{2+}_{1-x}M^{3+}_{x}(OH)_2]^{x+}[A^-_x.mH_2O]^{x-} \quad (1)$$

$$[M^{3+}_2(OH)_6M^{1+}]^{y+}[A^-_y.nH_2O]^{y-} \quad (2)$$

wherein $M^{1+}$ is a monovalent metal, such as Li, Na, K, Rb or Cs; $M^{2+}$ is a divalent metal, such as Mg, Ca, Fe, Co, Ni, Cu or Zn; $M^{3+}$ is a trivalent metal, such as Al, Fe, Cr or In, and $A^-$ is a monovalent exchangeable anion represented by OH, F, Cl, Br, I, $NO_3$ or $CH_3COO$. A part of the exchangeable anions may be polyvalent anions such as $CO_3$ or $SO_4$. x, y, m and n are numbers satisfying the following relations.

$0.1 \leqq x \leqq 0.4$ $0<y<2$ $0<m$, $0<n$

The compound represented by the above formula (1) wherein $M^{2+}$ is Mg and $M^{3+}$ is Al is generally called hydrotalcite. The unit layer of the hydrotalcite structure comprises a base layer that is positively charged by substitution of $M^{3-}$ for $M^{2+}$, and a negatively charged interlayer containing exchangeable anions and water molecules.

The compounds represented by the formulas (1) and (2), except the above-mentioned hydrotalcite, are called hydrotalcite-like compounds.

Examples of the hydrotalcite-like compounds include stichtite, pyroaurite, reevesite, takovite, honessite and inowaite and so on.

It is known that the hydrotalcite and the hydrotalcite-like compound are different in the structural break temperature but are the same in that the structures of these materials comprise positively charged, brucite-like hydroxide layers and negatively charged interlayers, and they have almost the same characteristics. These compounds are described in detail in "Smectite Research Society Bulletin" (Vol. 6, No. 1, pp. 12–26, 1996, May).

The hydrotalcite type compound can be prepared by, for example, a process described in S. Miyata, Clays & Clay Minerals, 23, 369–375 (1975). The particle diameter of the hydrotalcite type compound can be adjusted by controlling the reaction time, the reaction temperature and the chemical composition of raw materials. If the precipitate is separated immediately after the reaction, fine particles having an average particle diameter of not more than 1.0 μm can be obtained. The hydrotalcite type compound prepared by exchanging polyvalent anions ($CO_3^{2-}$) for monovalent anions of a synthesized hydrotalcite type compound with the polyvalent anions represented by $Mg_6Al_2(OH)_{16}CO_3.4H_2O$ can also be used as the present hydrotalcite type compound.

The hydrotalcite type compound has excellent ink absorption and fixing property of coloring matters. The reason has not been clarified but is presumably as follows.

In the hydrotalcite type compound, there are many OH on the surfaces of the base layers, so that large amounts of polar substances and ionic molecules can be easily adsorbed on the surfaces of interlayers. On the other hand, in the interlayer domains, monovalent anions are present as anions, so that the anionic coloring matters dissolved in the polar solvent and the monovalent anions can be easily exchanged, whereby the coloring matters can be fixed to the interlayer domains of the hydrotalcite. By virtue of the adsorption of the coloring matters on the surface of the hydrotalcite and fixing of the coloring matters to the interlayer domains due to the ion exchange, the above-mentioned excellent ink absorption and fixing property of coloring matters are exhibited.

The hydrotalcite type compound has excellent fixing property of coloring matter, and therefore even if the compound is exposed to moisture after completion of printing, it does not bring about bleeding or running of coloring matters and has high water resistance.

The layered compound for use in the invention has an average particle diameter of preferably not more than 1.0

μm, particularly preferably not more than 0.05 μm. If the average particle diameter exceeds 1.0 μm, clearness of an OHP sheet may be lowered.

The average particle diameter of the layered compound can be measured by a known method, for example, a sedimentation particle size measuring method or a light scattering method. Further, the average particle diameter can be determined by directly observing the particles with a transmission electron microscope or a scanning electron microscope to measure geometrical particle diameters and thereby obtain a frequency distribution or an integration distribution of each fraction based on the number of the particles.

The average particle diameter determined by any of the above methods is within the above-defined range, though it slightly varies depending on the measuring method.

Formation of Surface Layer

In the present invention, a surface layer containing the layered compound is formed on a surface of the substrate. In this layer, a mixture of two or more kinds of the layered compounds may be also used, or a mixture of a layered compound whose interlayer domains contain monovalent exchangeable anions and a layered compound whose interlayer domains contain polyvalent exchangeable anions such as $Mg_6Al_2(OH)_{16}CO_3.4H_2O$ and $Mg_6Cr_2(OH)_{16}CO_3.4H_2O$, may be also used.

The surface layer comprises the layered compound and a binder.

There is no specific limitation on the binder used for the layer. Examples of the binders include polymers having affinity for solvents (preferably hydrophilic polymers), such as polyethylene oxide, polyethylene glycol, polyethyleneimine, polypropylene oxide, polyvinyl pyrrolidone, sulfonated polystyrene, polyvinyl alcohol, polyvinyl pyridine, polyacrylic acid salt, polyacrylamide, polymethacrylic acid salt, polymethacrylamide, polyurethane, poly-N-vinylacetamide, a poly-N-vinylacetamide-sodium acrylate copolymer, derivatives of these polymers and crosslinked products of these polymers.

Also employable are hydrophilic polymers, which is optionally hydrolyzed, obtained by a process comprising graft polymerizing polysaccharides with polymerizable monomers or oligomers which are soluble or become soluble by hydrolysis; derivatives of the hydrophilic polymers; and crosslinked products of the hydrophilic polymers. Examples of the polysaccharides include starch, gelatin and cellulose. Examples of the polymerizable monomers include acrylic acid, acrylic acid salt, acryl ester, acrylamide, methacrylic acid, methacrylic acid salt, methacryl ester, methacrylamide, acrylonitrile, methacrylonitrile, maleic acid and sulfonated styrene. Examples of the oligomers include polyvinyl pyridine.

The amount of the layered compound in the surface layer is 1~70% by weight, preferably 5~60% by weight. If the amount of the layered compound is less than 1%, ink absorption and fixing of coloring matters become sometimes insufficient. In addition, the amount of the binder is less than 30% by weight, the smoothness of the surface layer is decreased to occasionally cause crazing of the surface layer.

There is no specific limitation on the method to uniformly disperse the layered compound in the organic polymer as a binder. For example, a method wherein a homogeneous solution or emulsion of the organic polymer in water or an organic solvent is uniformly mixed with the layered compound or a method wherein the layered compound is added to a molten organic polymer and they are kneaded is available. In the melt kneading method, it is desired to use a single-screw extruder, a twin-screw extruder, a brabender, a kneader, a Banbury mixer or the like.

There is no specific limitation on the method to form the surface layer on the surface of the substrate, and an appropriate method is adopted according to the characteristics of the resin of the substrate. For example, a method wherein a solution or emulsion containing the layered compound and a resin component is applied onto the resin substrate and the solvent is removed or a method (heat lamination method) wherein a molten resin containing the layered compound is applied onto the substrate is preferably employed. Application of the solution or emulsion containing the layered compound onto the substrate can be made using various coaters, such as a bar coater, a roll coater, an air-knife coater, a blade coater and a rod coater. In the above methods, a substrate sheet (or film) wound around a roll is preferably employed.

The thickness of the surface layer formed on the resin substrate is desired to be in the range of 3 to 100 μm, preferably 5 to 50 μm. When the thickness of the layer is smaller than this, the layer cannot maintain sufficient ink absorption, and thereby bleeding or running of ink may occur. When the thickness of the layer is larger than the above thickness, lowering of clearness may occur. Moreover, crazing or peeling of the surface layer sometimes takes place at printing by means of an ink-jet printer.

For providing the surface layer on the substrate, a method of coating the substrate with the solution or like to form the layer is most commonly carried out. In the recording medium of the invention, however, the layered compound needs only be present on a surface (surface where printing is made) of the substrate. In a special case, therefore, the layered compound can be incorporated in the substrate, at least the surface of the substrate.

The recording medium according to the invention is capable of rapidly absorbing ink, brings about no bleeding or running of ink even if the printed dots are overlapped, and has a printed surface of excellent moisture resistance after printing. Accordingly, the recording medium of the invention can be used for an ordinary printing system using coloring matters such as dyes or pigments, and is particularly suitable as an ink-jet recording sheet.

Effect of the Invention

The recording medium of the invention can form a fine, clear and sharp image. Further, the recording medium is improved in the fixing property of coloring matter and thereby has high water resistance, so that the printed surface of the recording medium is almost free from bleeding even when exposed to moisture.

The recording medium of the invention can be used for an ordinary printing system using coloring matters such as dyes or pigments, and is particularly suitable for an ink-jet recording system.

EXAMPLE

The present invention is further described with reference to the following examples, but it should be construed that the invention is in no way limited to those examples.

In the examples, color and resolution of an image formed on the recording medium (recording sheet) and water resistance and transparency of the recording medium were evaluated in the following manner.

Evaluation of Color and Resolution

An image was printed on the recording sheet using dyes of four colors (magenta, cyan, yellow and black), and the image was relatively evaluated on the color and resolution by the following five criteria.

Color

5: The density of the image is sufficiently high, and the image is sharp.

4: The density of the image is high.

3: The density of the image is slightly low.

2: The density of the image is low.

1: The density of the image is very low, and the shape of the image is not retained.

Resolution

5: The dot shape is very sharp.

4: The dot shape is sharp.

3: The dot shape is partly collapsed but has no problem in the practical use.

2: The dot shape is partly retained.

1: The dot shape is not retained.

A recording medium ranked 3 or higher is satisfactory in the practical use.

Evaluation of Water Resistance

An image was printed on the recording sheet, and the sheet was dried. On the sheet, 10 μl of water was dropped, and the sheet was dried. Then, the sheet was relatively evaluated on the bleeding by the following five criteria.

5: Even after drying, the image remains as it is and no bleeding takes place.

4: After drying, slight bleeding of dyes takes place.

3: Though the image remains, bleeding takes place on the whole image.

2: After dropping of water, bleeding takes place in a large area and the image is hardly seen.

1: Immediately after dropping of water, the ink is redissolved in water to cause widespread bleeding, and the whole area where water is dropped is bled, whereby the image cannot be seen.

Evaluation of Transparency

The transparency of the recording sheet was evaluated in the following manner. The recording sheet was cut into a specimen of 5 cm×5 cm, and the specimen was measured on the total quantity of the transmitted light Tt (%) and haze (%) by a haze meter (HR-100 type, available from Murakami Color Technology Research Institute K.K.) in accordance with ASTM D-1003.

Example 1

Preparation of Hydrotalcite

Hydrotalcite was prepared in accordance with a process described in S. Miyata, Clays & Clay Minerals, 23, 369–375 (1975) using $MgCl_2$, $AlCl_3$ and NaOH as raw materials. In the preparation, the dropping rate of NaOH was 50 ml/min, and the reaction temperature was 5° C.

The hydrotalcite thus obtained was hydrotalcite represented by the formula $Mg_{0.7}Al_{0.3}(OH)_2Cl_{0.3}.0.6H_2O$.

The particles of the hydrotalcite were observed by a transmission electron microscope (CX-200, available from Japan Electron Optics Laboratory Co., Ltd.) at a voltage of 120 KV to measure longer and shorter diameters. From the diameters, an average particle diameter was calculated. As a result, the hydrotalcite had a particle diameter distribution of 0.005 to 1.0 μm and an average particle diameter of 0.02 μm.

Preparation of Coating Solution

In a beaker, the hydrotalcite obtained above was immersed in a distilled water/ethanol/isopropyl alcohol mixed solvent (2/1/1, by weight). To the beaker, an aqueous solution of polyethyleneimine (available from Aldrich Co., molecular weight: 750,000) was added at about 60° C. with stirring. The resulting solution was sufficiently stirred to prepare a homogeneous coating solution having a total solid concentration of 10% by weight and a hydrotalcite/polyethyleneimine weight ratio of 0.1.

Preparation of Recording Sheet

About 15% by weight of an isocyanate type anchor agent (SEIKADYNE 3600, available from Dainichiseika Color & Chemicals MFG. CO., LTD.) was dissolved in an ethyl acetate/toluene mixed solvent (mixing ratio by weight: 7/6) to give a solution. Then, a polyester sheet (thickness: 100 μm) was coated with the solution in a thickness of 1 μm by means of a bar coater, followed by drying in an oven at 60° C. for several minutes. Then, the dried layer of the sheet was further coated with the coating solution obtained above by means of a bar coater. The coated layer was dried at room temperature and then further dried in an over at 60° C. for several minutes to form a hydrotalcite-containing layer having a thickness of 30 μm, whereby a transparent recording sheet was prepared.

Then, printing was made on the recording sheet by means of an ink-jet printer, and the quality and color of the resulting image and water resistance and transparency of the sheet were evaluated in the manner described above.

The results are set forth in Table 1.

Example 2

A coating solution was prepared in the same manner as in Example 1, except that polyvinyl alcohol (PVA117, available from Kuraray Co., Ltd.) was used in place of polyethyleneimine so that the resulting coating solution had a hydrotalcite/polyvinyl alcohol ratio (by weight) of 0.1. Using the coating solution, a recording sheet was prepared in the same manner as in Example 1. Then, the same evaluation as in Example 1 was carried out.

The results are set forth in Table 1.

Example 3

A coating solution was prepared in the same manner as in Example 1, except that polyvinyl pyrrolidone (available from Aldrich Co., molecular weight: 10,000) was used in place of polyethyleneimine so that the resulting coating solution had a hydrotalcite/polyvinyl pyrrolidone ratio (by weight) of 0.1. Using the coating solution, a recording sheet was prepared in the same manner as in Example 1. Then, the same evaluation as in Example 1 was carried out.

The results are set forth in Table 1.

Example 4

A coating solution was prepared in the same manner as in Example 1, except that the hydrotalcite of Example 1 was mixed with a dilute $Na_2SO_4$ aqueous solution to exchange a part of ion-exchangeable anions $Cl^-$ for $SO_4^{2-}$ so that the $Cl^-/SO_4^{2-}$ ratio by mol became 7/3. Using the coating solution, a recording sheet was prepared in the same manner as in Example 1. Then, the same evaluation as in Example 1 was carried out.

The results are set forth in Table 1.

Example 5

A coating solution was prepared in the same manner as in Example 1, except that the hydrotalcite/polyethyleneimine ratio (by weight) was varied to 0.05. Using the coating solution, a recording sheet was prepared in the same manner as in Example 1. Then, the same evaluation as in Example 1 was carried out.

The results are set forth in Table 1.

Referential Example

A hydrotalcite compound represented by the formula $[Mg_6Cr_2(OH)_{16}CO_3.4H_2O]$ was subjected to pulverization and water elutriation to obtain a hydrotalcite compound powder having an average particle diameter of 0.8 μm. Then, a coating solution was prepared in the same manner as in Example 1, except that the stiphitite powder was used in place of the hydrotalcite so that the resulting solution had a hydrotalcite compound/polyethyleneimine ratio (by weight) of 0.1. Using the coating solution, a recording sheet was prepared in the same manner as in Example 1. Then, the same evaluation as in Example 1 was carried out.

The results are set forth in Table 1.

Comparative Example 1

A coating solution was prepared in the same manner as in Example 1, except that synthetic hydrotalcite (Kyowaad KW-500, available from Kyowa Kagaku K.K.) represented by the formula $Mg_6Al_2(OH)_{16}CO_3.4H_2O$ was used in place of the hydrotalcite of Example 1 so that the resulting solution had a KW-500/polyethyleneimine ratio (by weight) of 0.1. Using the coating solution, a recording sheet was prepared in the same manner as in Example 1. Then, the same evaluation as in Example 1 was carried out.

The results are set forth in Table 1.

Comparative Example 2

Printing was made on an OHP sheet for ink jet system (CF-102, available from Canon, Inc.), and the same evaluation as in Example 1 was carried out.

The results are set forth in Table 1.

TABLE 1

| | Color | Resolution | Moisture resistance | Tt (%) | Haze (%) |
|---|---|---|---|---|---|
| Ex. 1 | 5 | 5 | 5 | 90 | 4.9 |
| Ex. 2 | 5 | 5 | 4 | 93 | 6.1 |
| Ex. 3 | 5 | 5 | 4 | 81 | 9.0 |
| Ex. 4 | 4 | 4 | 3 | 87 | 4.8 |
| Rx. 5 | 4 | 4 | 3 | 95 | 3.5 |
| Ref. Ex. | 3 | 4 | 4 | 85 | 8.7 |
| Comp. Ex. 1 | 3 | 2 | 3 | 69 | 24.5 |
| Comp. Ex. 2 | 3 | 2 | 2 | 90 | 8.6 |

What is claimed is:

1. A recording medium having a surface layer containing a compound having a layer structure on a substrate, wherein exchangeable anions are present between layers of the compound, at least a part of said exchangeable anions are monovalent anions, which is at least one anion selected from the group consisting of $OH^-$, $F^-$, $Cl^-$ and $Br^-$, and the ionic charge of the monovalent anions is not less than 50% of the total ionic charge of the exchangeable anions.

2. The recording medium as claimed in claim 1, wherein the compound having a layer structure has an average particle diameter of not more than 1.0 μm.

3. The recording medium as claimed in claim 1, wherein the compound having a layer structure is contained in the surface layer in an amount of 1 to 70% by weight.

4. The recording medium as claimed in claim 1, wherein the surface layer has a thickness of 3.0 to 100 μm.

5. The recording medium as claimed in claim 1, wherein said substrate is selected from the group consisting of paper, synthetic fiber, non-woven fabric and synthetic resin film.

6. The recording medium as claimed in claim 1, wherein the compound having a layer structure is a hydrotalcite or a hydrotalcite-like compound represented by the following formulas:

$$[M^{2+}_{1-x}M^{3+}_x(OH)_2]^{x+}[A^-_x.mH_2O]^{x-}$$

$$[M^{3+}_2(OH)_6M^{1+}]^{y+}[A^-_y.nH_2O]^{y-}$$

wherein $M^{1+}$ is a monovalent metal cation, $M^{2+}$ is a divalent metal cation, $M^{3+}$ is a trivalent metal cation, $A^-$ is a monovalent exchangeable anion, and x, y, m and n are numbers satisfying the following relations: $0.1 \leqq x \leqq 0.4$; $0<y<2$; and $0<m$, $0<n$.

* * * * *